(12) United States Patent
Murakami

(10) Patent No.: US 9,438,842 B2
(45) Date of Patent: Sep. 6, 2016

(54) REPRODUCTION CONTROL APPARATUS, REPRODUCTION CONTROL METHOD, AND STORAGE MEDIUM

(71) Applicant: CANON KABUSHIKI KAISHA, Tokyo (JP)

(72) Inventor: Naoyuki Murakami, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 25 days.

(21) Appl. No.: 14/097,473

(22) Filed: Dec. 5, 2013

(65) Prior Publication Data

US 2014/0153908 A1    Jun. 5, 2014

(30) Foreign Application Priority Data

Dec. 5, 2012   (JP) .................. 2012-266226
Nov. 29, 2013  (JP) .................. 2013-247637

(51) Int. Cl.

| | |
|---|---|
| *H04N 5/783* | (2006.01) |
| *H04N 5/44* | (2011.01) |
| *H04N 5/77* | (2006.01) |
| *H04N 21/432* | (2011.01) |
| *H04N 21/44* | (2011.01) |
| *H04N 21/472* | (2011.01) |
| *G11B 27/00* | (2006.01) |
| *G11B 27/28* | (2006.01) |
| *G11B 27/34* | (2006.01) |
| *G06F 3/0484* | (2013.01) |
| *G06F 3/0488* | (2013.01) |

(Continued)

(52) U.S. Cl.
CPC .......... *H04N 5/4403* (2013.01); *G06F 3/0484* (2013.01); *G06F 3/04883* (2013.01); *G11B 27/002* (2013.01); *G11B 27/28* (2013.01); *G11B 27/34* (2013.01); *H04N 5/772* (2013.01); *H04N 5/783* (2013.01); *H04N 21/4325* (2013.01); *H04N 21/44012* (2013.01); *H04N 21/47205* (2013.01); *H04N 21/47217* (2013.01); *H04N 5/907* (2013.01); *H04N 9/8042* (2013.01); *H04N 9/8211* (2013.01)

(58) Field of Classification Search
CPC ............... H04N 9/8205; H04N 21/47205; H04N 21/47217
USPC .................................................. 386/343, 350
See application file for complete search history.

(56) References Cited

U.S. PATENT DOCUMENTS 8,797,588 B2 *   8/2014   Yamada ............... G06F 3/1204
                                                    358/1.14

(Continued)

FOREIGN PATENT DOCUMENTS

JP        2001-211408 A       8/2001

*Primary Examiner* — Helen Shibru
(74) *Attorney, Agent, or Firm* — Rossi, Kimms & McDowell LLP

(57) ABSTRACT

A reproduction control apparatus that enables a user to perform fast forward and fast rewind of a moving image by an intuitive operation, and provides good operability. The reproduction apparatus controls reproduction of a moving image including a plurality of frames. A controller detects selection of an area including an object by a user's touch operation during reproduction of the moving image. The size of an object is detected for each of the plurality of frames. The controller searches for a frame including the object, which corresponds in size to the size of the selected area, and the frame found by the search is reproduced and displayed.

10 Claims, 12 Drawing Sheets

(51) Int. Cl.
    *H04N 5/907* (2006.01)
    *H04N 9/804* (2006.01)
    *H04N 9/82* (2006.01)

(56) References Cited

U.S. PATENT DOCUMENTS

| | | | |
|---|---|---|---|
| 2006/0059426 A1* | 3/2006 | Ogikubo | 715/723 |
| 2007/0030391 A1* | 2/2007 | Kim | G06K 9/00751 348/564 |
| 2008/0022230 A1* | 1/2008 | Ogawa | G06F 3/0481 715/838 |
| 2008/0077866 A1* | 3/2008 | Margulis | 715/723 |
| 2009/0058830 A1* | 3/2009 | Herz et al. | 345/173 |
| 2010/0271478 A1* | 10/2010 | Oya | H04N 5/76 348/143 |
| 2011/0050944 A1* | 3/2011 | Nakamura | H04N 5/772 348/222.1 |
| 2012/0087636 A1* | 4/2012 | Kudo | H04N 21/4325 386/241 |
| 2014/0111486 A1* | 4/2014 | Zay et al. | 345/178 |

* cited by examiner

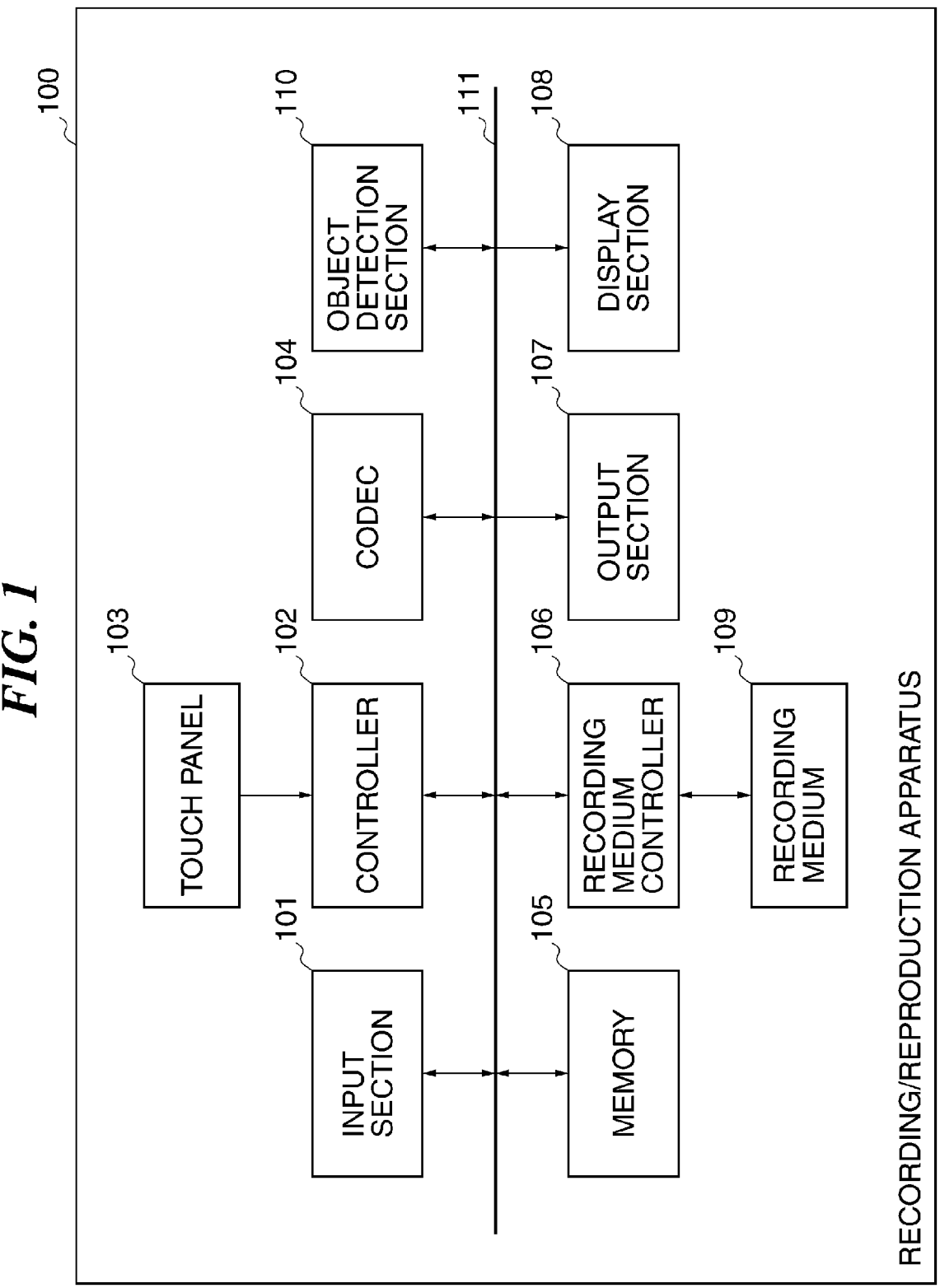

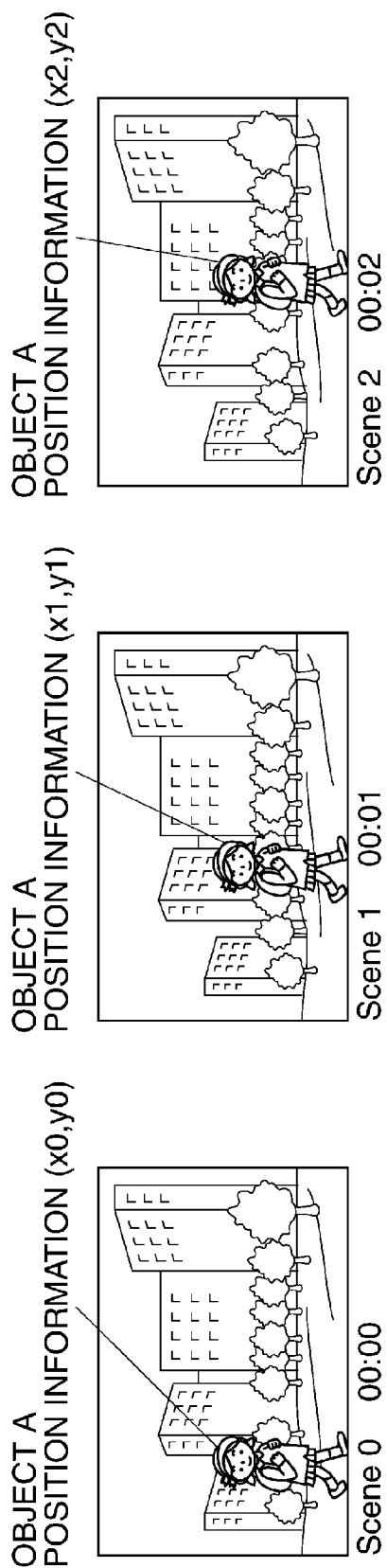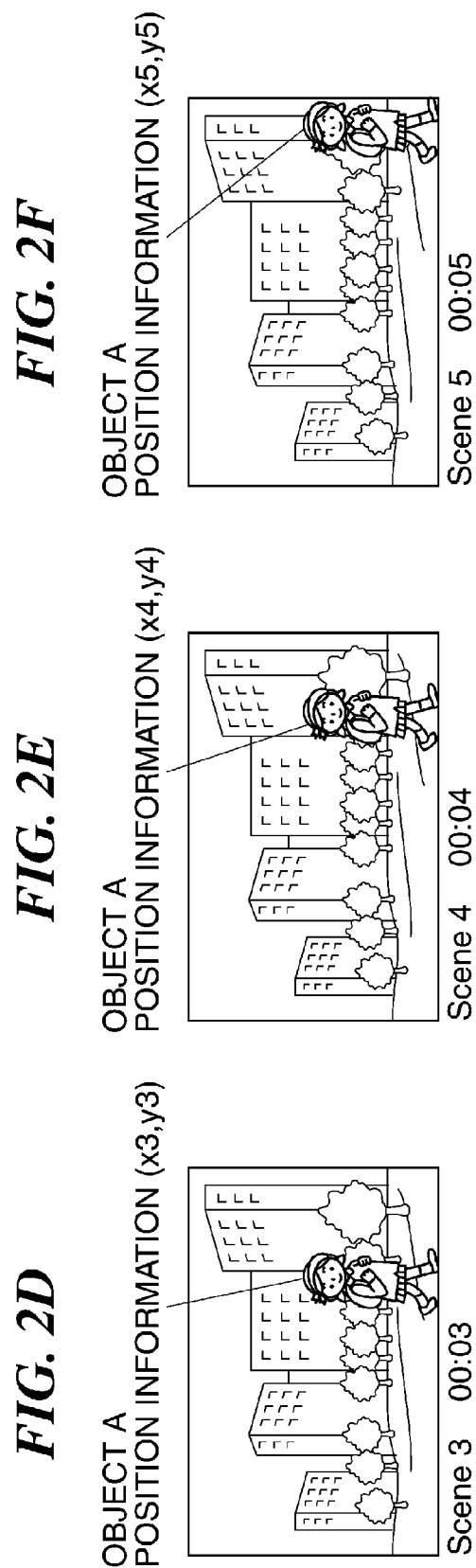

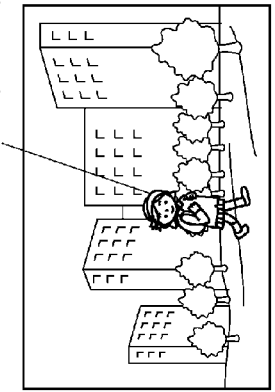

FIG. 5A

OBJECT A
POSITION INFORMATION (x0,y0)
SIZE INFORMATION (w0,h0)

Scene 0   00:00

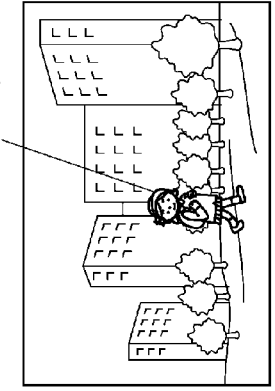

FIG. 5B

OBJECT A
POSITION INFORMATION (x1,y1)
SIZE INFORMATION (w1,h1)

Scene 1   00:01

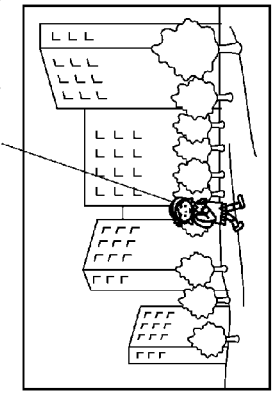

FIG. 5C

OBJECT A
POSITION INFORMATION (x2,y2)
SIZE INFORMATION (w2,h2)

Scene 2   00:02

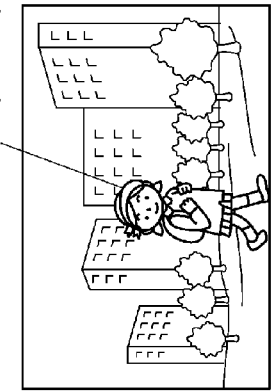

FIG. 5D

OBJECT A
POSITION INFORMATION (x3,y3)
SIZE INFORMATION (w3,h3)

Scene 3   00:03

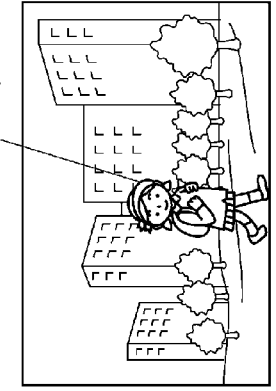

FIG. 5E

OBJECT A
POSITION INFORMATION (x4,y4)
SIZE INFORMATION (w4,h4)

Scene 4   00:04

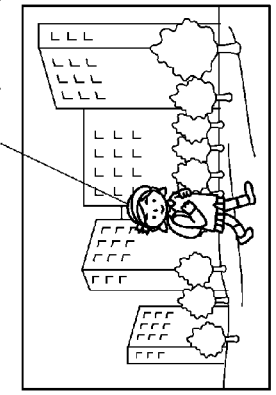

FIG. 5F

OBJECT A
POSITION INFORMATION (x5,y5)
SIZE INFORMATION (w5,h5)

Scene 5   00:05

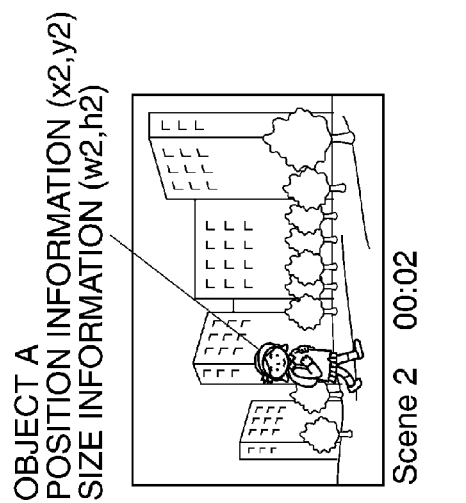
FIG. 8A
FIG. 8B
FIG. 8C
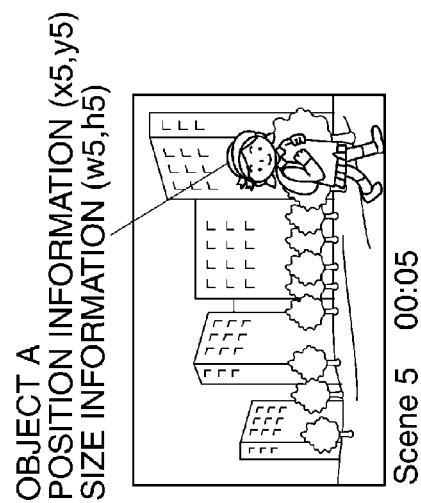
FIG. 8D
FIG. 8E
FIG. 8F

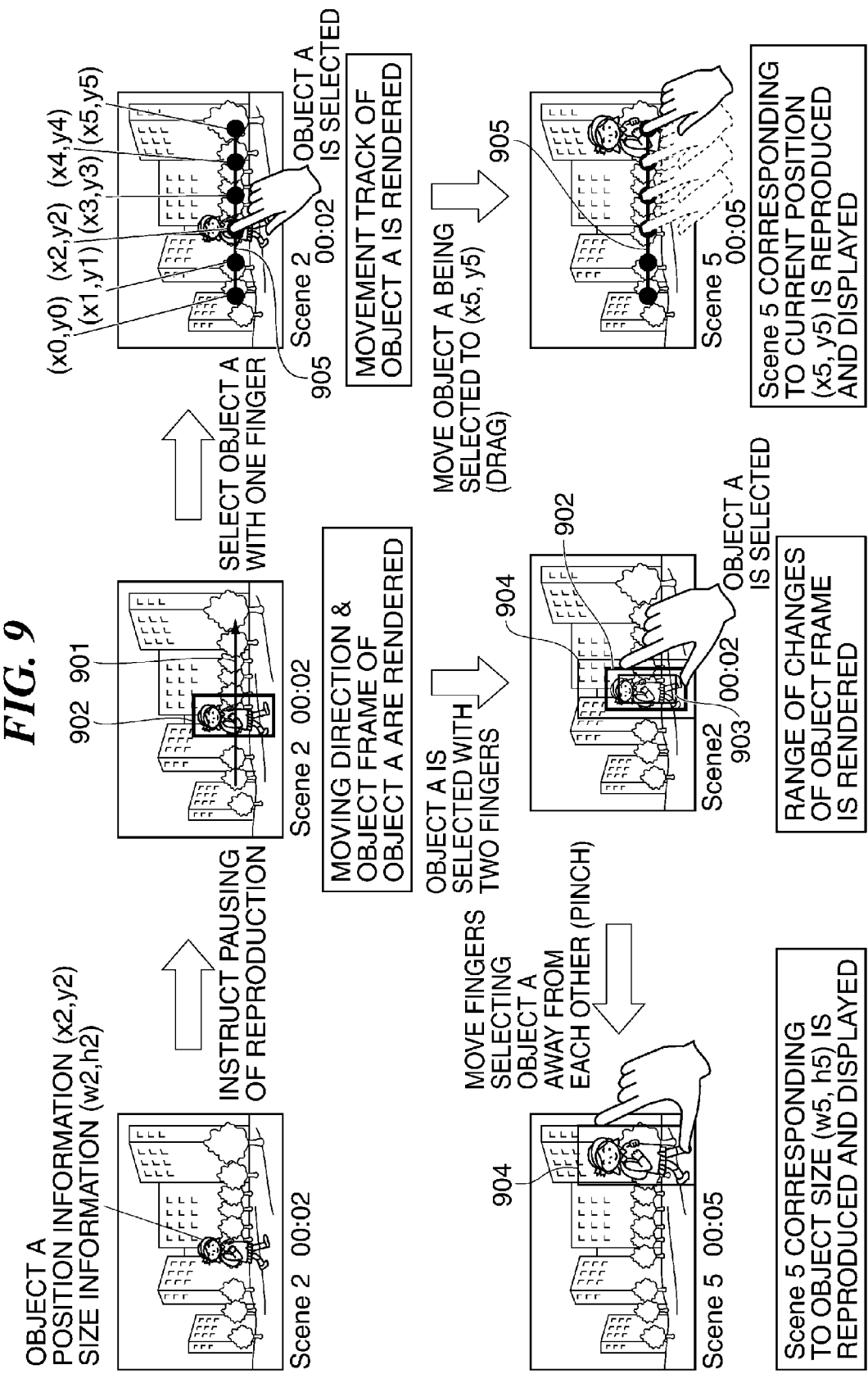

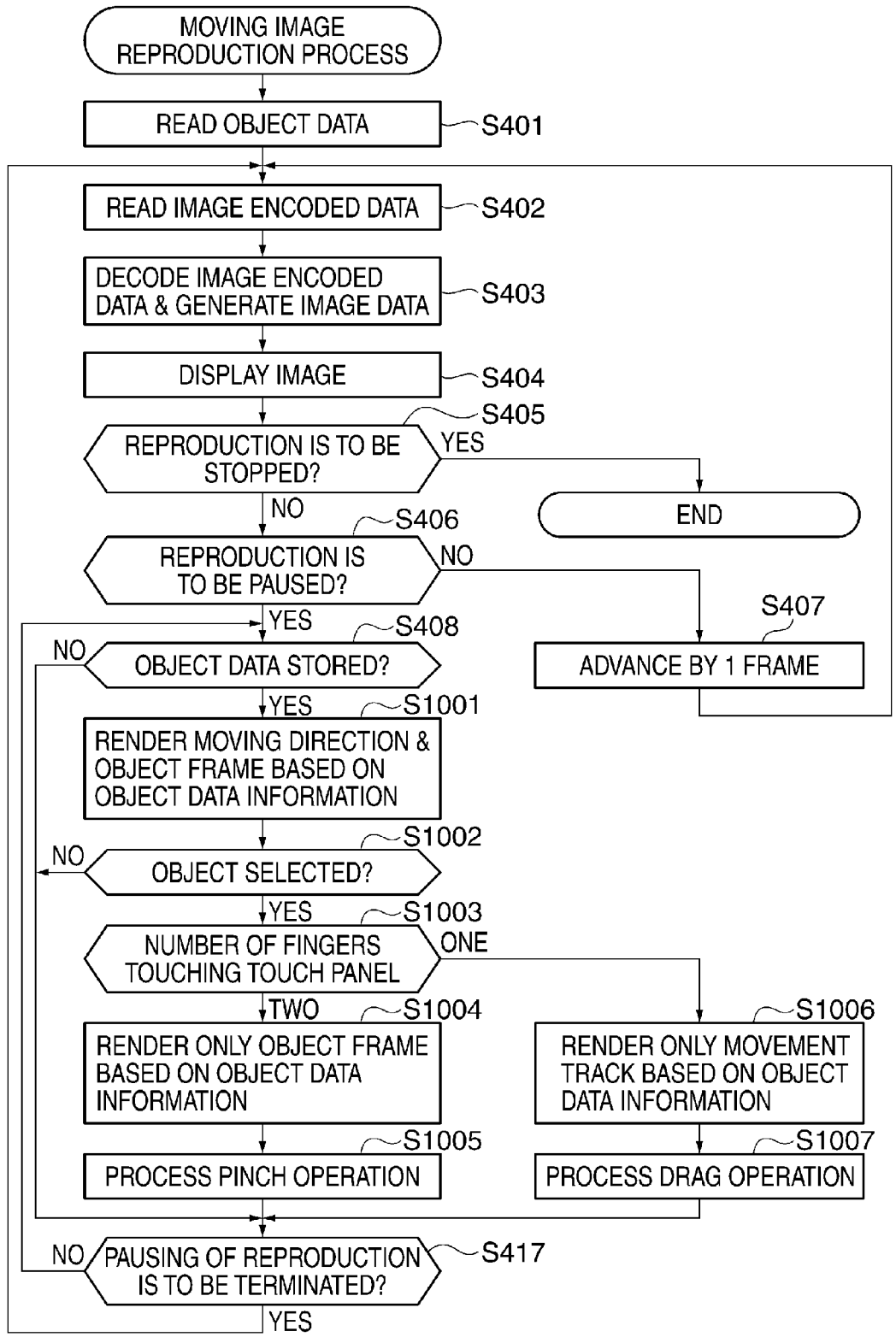

FIG. 11
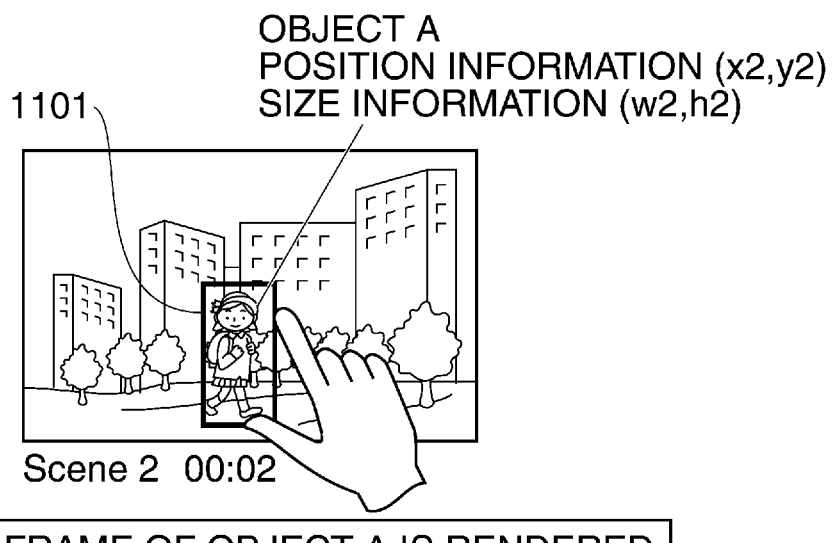
OBJECT FRAME OF OBJECT A IS RENDERED
CHANGE DISTANCE BETWEEN FINGERS SELECTING OBJECT A (PINCH)
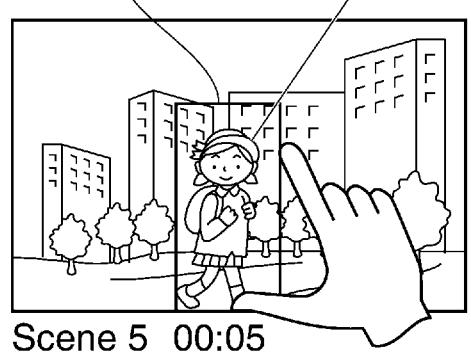

REPRODUCTION CONTROL APPARATUS, REPRODUCTION CONTROL METHOD, AND STORAGE MEDIUM

BACKGROUND OF THE INVENTION

1. Field of the Invention

The present invention relates to a reproduction control apparatus that reproduces a moving image, a reproduction control method, and a storage medium storing a control program for executing the reproduction control method, and more particularly to a technique used when performing an operation for reproducing a moving image using e.g. a touch panel.

2. Description of the Related Art

Conventionally, in recording/reproduction apparatuses, such as an information processing apparatus, when searching a displayed video for a scene intended by a user, fast forward or fast rewind of the video is performed by operating a button or a seek bar arranged on a screen, using a mouse, physical keys, or a touch panel (see e.g. Japanese Patent Laid-Open Publication No. 2001-211408).

However, in the technique described in Japanese Patent Laid-Open Publication No. 2001-211408, since a user searches for a scene intended by the user by fast forward or fast rewind, the user is required to check whether or not a scene displayed on the screen is the intended one. For this reason, the user often does not know whether or not the scene is the intended one before the scene is actually displayed on the screen, and hence a lot of time is required to display the scene intended by the user, which reduces user-friendliness.

SUMMARY OF THE INVENTION

The present invention provides a reproduction control apparatus that enables a user to perform fast forward and fast rewind of a moving image by an intuitive operation, and provides good operability, a reproduction control method, and a storage medium storing a control program for executing the reproduction control method.

In a first aspect of the present invention, there is provided a reproduction control apparatus that controls reproduction of a moving image including a plurality of frames, comprising a reproduction control unit configured to control reproduction of a moving image, a selection detection unit configured to detect selection of an area including an object during reproduction of the moving image, in response to a user's operation, an object detection unit configured to detect a size of an object for each of the plurality of frames, and a search unit configured to perform searching for a frame including an object corresponding in size to a size of the selected area, wherein said reproduction control unit reproduces the frame found by said searching.

In a second aspect of the present invention, there is provided a reproduction control method of controlling reproduction of a moving image including a plurality of frames, comprising: detecting selection of an area including an object during reproduction of the moving image, in response to a user's operation, detecting a size of an object for each of the plurality of frames, searching for a frame including an object corresponding in size to a size of the selected area, and reproducing the frame found by said searching.

In a third aspect of the present invention, there is provided a non-transitory computer-readable storage medium storing a computer-executable control program for causing a computer to execute a reproduction control method of controlling reproduction of a moving image including a plurality of frames, wherein the method comprises detecting selection of an area including an object during reproduction of the moving image, in response to a user's operation, detecting a size of an object for each of the plurality of frames, searching for a frame including an object corresponding in size to a size of the selected area, and reproducing the frame found by said searching.

According to the present invention, it is possible to perform fast forward and fast rewind of a moving image by an intuitive operation, and provide good operability therefor.

Further features of the present invention will become apparent from the following description of exemplary embodiments with reference to the attached drawings.

BRIEF DESCRIPTION OF THE DRAWINGS

FIG. 1 is a block diagram of a recording/reproduction apparatus as a reproduction control apparatus according to a first embodiment of the present invention.

FIGS. 2A to 2F are diagrams showing an example of a moving image displayed on a display section appearing in FIG. 1, in which an object is moving from left to right.

FIGS. 5A to 5F are diagrams showing an example of a moving image displayed on a display section of a recording/reproduction apparatus as a reproduction control apparatus according to a second embodiment of the present invention, in which an object is moving toward a camera.

FIGS. 8A to 8F are diagrams showing an example of a moving image displayed on the display section of a recording/reproduction apparatus as a reproduction control apparatus according to a second embodiment of the present invention, in which an object is moving toward the camera, while moving in a lateral direction.

FIG. 9 is a diagram useful in explaining fast-forward or fast-rewind reproduction of the moving image, shown in FIGS. 8A to 8F.

FIG. 10 is a flowchart of a moving image reproduction process for realizing moving image reproduction shown in FIG. 9.

FIG. 11 is a diagram showing an example of selection of a frame (image) to be displayed according to a pinch operation.

DESCRIPTION OF THE EMBODIMENTS

Figure 3:
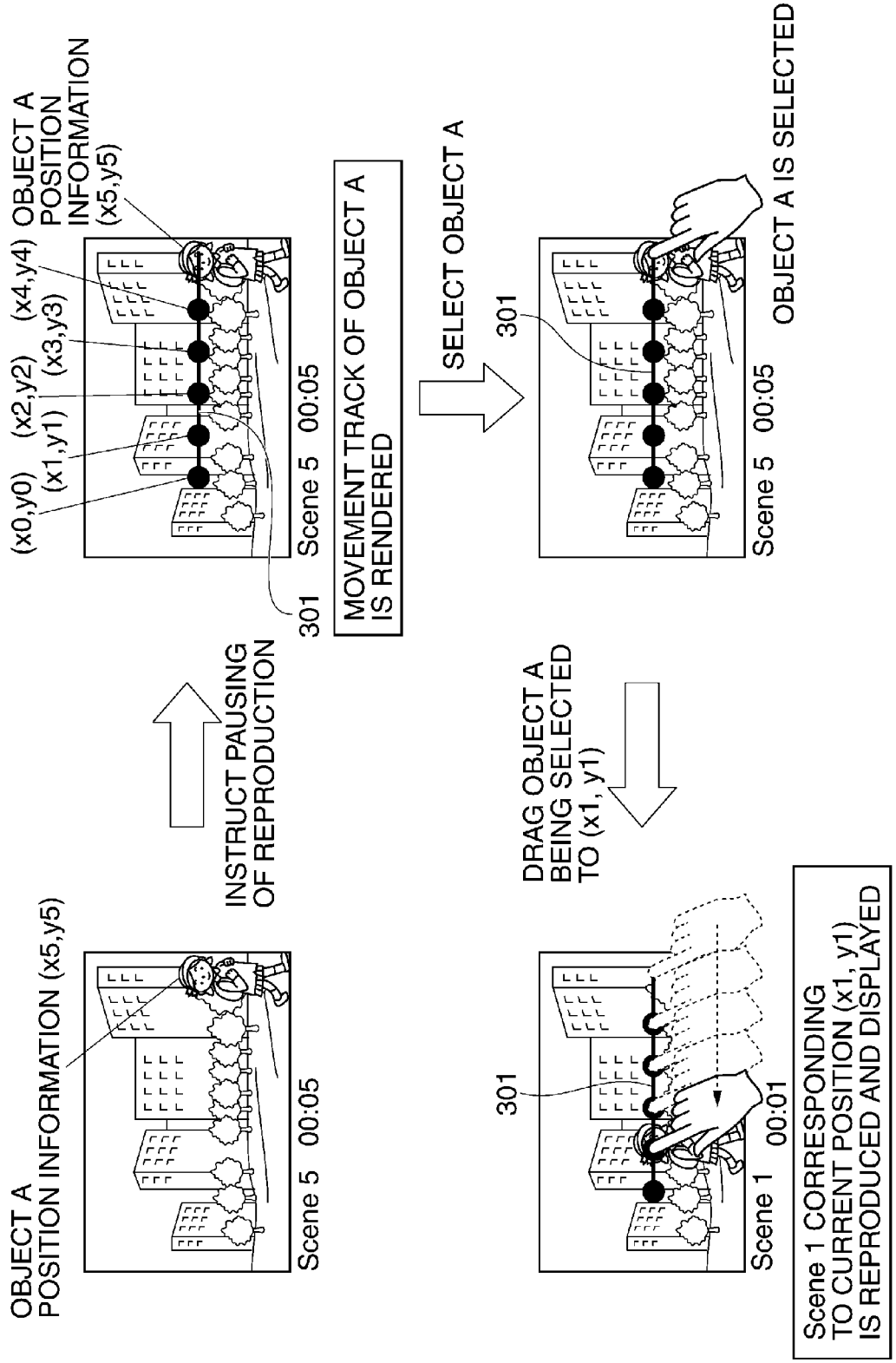
FIG. 3 is a diagram useful in explaining fast-forward or fast-rewind reproduction of the moving image, shown in FIGS. 2A to 2F.

The present invention will now be described in detail below with reference to the accompanying drawings showing embodiments thereof.

FIG. 1 is a block diagram of a recording/reproduction apparatus 100 as a reproduction control apparatus according to a first embodiment of the present invention.

The illustrated recording/reproduction apparatus is e.g. a video camera or a digital camera having a touch panel, but may be an electronic apparatus that is capable of recording and reproducing a moving image, such as a smartphone.

The recording/reproduction apparatus 100 includes an input section 101, a controller 102, a coder-decoder (CODEC) 104, a memory 105, a recording medium controller 106, an output section 107, a display section 108, and an object detection section 110, which are interconnected via an internal bus 111. Further, a touch panel 103 is connected to the controller 102, and a recording medium 109 is connected to the recording medium controller 106.

The input section 101 acquires a video signal (also referred to as the moving image signal) having a plurality of frames, and an audio signal. Note that the moving image signal and the audio signal acquired by the input section 101 are supplied from the outside of the recording/reproduction apparatus 100. The input section 101 may include an image pickup section and a microphone, and acquire the moving image signal and the audio signal by converting video acquired as a result of the image pickup operation by the image pickup section and voice acquired by the microphone to digital signals, respectively.

The controller 102 controls the overall operation of the recording/reproduction apparatus 100 according to the operation of the touch panel 103 (touch operation). In doing this, as described hereinafter, when touch operations on two points on the touch panel 103 are detected, the controller 102 calculates a distance between the two points. The touch panel 103 is supposedly arranged on the display section 108, and a user can perform touch operation on UI (user interface) components displayed on the display section 108, such as buttons, via the touch panel 103.

The touch panel 103 notifies the controller 102 of position information indicative of a position at which a pointing member (e.g. a user's finger) touches the touch panel 103. In the present embodiment, the touch panel 103 is also used as e.g. a switch for instructing start and stop of recording or reproduction of a moving image, and a switch for changing a mode of the recording/reproduction apparatus 100.

The controller 102 includes a microcomputer, a memory, and so forth, and controls the recording/reproduction apparatus 100 according to a program stored in an internal memory. Further, the controller 102 incorporates a recording medium interface (I/F), and transmits and receives data and commands to and from the recording medium controller 106 via the recording medium interface.

In the recording operation, the CODEC 104 encodes the video signal and the audio signal input by the input section 101 according to H.264/AVC (advanced video coding) which is a video compression coding method and AAC (advanced audio coding) which is an audio compression method to thereby reduce the data amounts of the video signal and the audio signal, by compression.

The memory 105 is used as a buffer memory for temporarily storing the moving image signal and the audio signal. In the recording/reproduction apparatus 100, the moving image signal and the audio signal are read by accessing the memory 105, and are processed. Further, the memory 105 stores not only a moving image signal and an audio signal but also various information, such as file information based on a file system, and also functions as a work memory for the controller 102.

The recording medium controller 106 records the moving image signal and the audio signal, or various information, in the recording medium 109, and reproduces the recorded information, etc. For example, in a recording mode, the recording medium controller 106 records the moving image signal and the audio signal accumulated in the memory 105, in the recording medium 109. Further, in a reproduction mode, the recording medium controller 106 reads the recorded moving image signal and audio signal from the recording medium 109, and stores the read signals in the memory 105.

In the illustrated example, the recording medium 109 is a flash memory, such as a SD memory card, or a random accessible recording medium. Further, the recording medium 109 can be mounted and removed to and from the recording/reproduction apparatus 100 by a recording medium mounting/ejecting mechanism (not shown), but may be incorporated in the recording/reproduction apparatus 100.

The recording medium controller 106 manages the moving image signal and the audio signal, and various information to be recorded in the recording medium 109 as files based on a file system, such as a FAT (file allocation table). Further, the recording medium controller 106 includes a known interface (I/F), such as an ATA (advanced technology attachment) interface or SD CARD interface, and transmits and receives data and various commands to and from the controller 102 via the interface.

When the controller 102 writes or reads data (file) of the moving image signal, the audio signal, and the like, in or from the recording medium 109, the controller 102 controls the recording medium controller 106 to reproduce file system data from the recording medium 109, and stores the file system data in the memory 105. The file system data is indicative of a file name and a file size of data recorded in the recording medium 109, addresses at which the data is recorded, and so forth, and is management information for managing the files.

The controller 102 controls writing or reading of a file according to the read file system data. The controller 102 updates the file system data stored in the memory 105 according to writing of a file in the recording medium 109. Then, the controller 102 causes the recording medium controller 106 to record the updated file system data in the recording medium 109.

The user can provide instructions for switching an operation mode of the recording/reproduction apparatus 100, starting and stopping the recording or reproduction of a still image or a moving image, and so on, by performing a touch operation on the touch panel 103, i.e. touching selected ones of the various buttons displayed on the display section 108.

The output section 107 outputs the reproduced moving image signal and audio signal e.g. to a display device outside the recording/reproduction apparatus 100. On the display section 108, there are displayed a video of a still image or a moving image, various information, and the buttons used for operating the touch panel.

The object detection section 110 detects areas of objects from the moving image signal in the recording mode or the reproduction mode, and detects a position and a size of each object on the image (i.e. on a screen) on an object-by-object basis.

Now, a description will be given of a search for an object moving on the screen by a drag operation, performed in the recording/reproduction apparatus 100 shown in FIG. 1.

FIGS. 2A to 2F are diagrams showing an example of a moving image displayed on the display section 108 appearing in FIG. 1, in which an object is moving from left to right.

The moving image shown in FIGS. 2A to 2F has scenes (Scene) 0 to 5, and each scene has the following reproduction time:

| <scene> | <reproduction time> |
|---|---|
| Scene 0 | 00:00 |
| Scene 1 | 00:01 |
| Scene 2 | 00:02 |
| Scene 3 | 00:03 |
| Scene 4 | 00:04 |
| Scene 5 | 00:05 |

By performing object detection on the moving image shown in FIGS. 2A to 2F, the object detection section 110 detects an object A when Scene 0 is recorded. Then, the object detection section 110 stores the position information (x0, y0), the size information (w0, h0), and the reproduction time (i.e. reproduction sequence number) 00:00 of the object A in the recording medium 109 as object reproduction tracking data (also simply referred to as the object data) A under the control of the controller 102. Note that the position information of the object is expressed e.g. by coordinates of a center of the detected object area or coordinates of a top leftmost point of the detected object area, and the definition is provided in advance. Further, the size information indicates the width and height of a rectangle which defines the detected object area.

Next, the object detection section 110 determines whether or not an object detected when Scene 1 is recorded is identical to the object A which has been already registered. Then, if it is determined that the detected object is identical to the object A, the object detection section 110 records the position information (x1, y1), the size information (w1, h1), and the reproduction time 00:01 of the object A in Scene 1 in the recording medium 109 as the object reproduction track data A under the control of the controller 102.

Similarly, the object detection section 110 records the position information (detected position), the size information, and the reproduction time of the object A in the recording medium 109 as the object reproduction track data A for each of Scene 2 to Scene 5 under the control of the controller 102. As a result, information described hereafter is recorded in the recording medium 109 as the object reproduction track data A of Scene 0 to Scene 5:

Note that if the object A moves while maintaining substantially the same distance from the camera, Scene 0 to Scene 5 have substantially the same size information, and hence in this case, the size information is not used in a moving image reproduction process, described hereinafter.

| object reproduction track data A | position information | size information | reproduction time |
|---|---|---|---|
| Scene 0 | (x0, y0) | (w0, h0) | 00:00 |
| Scene 1 | (x1, y1) | (w1, h1) | 00:01 |
| Scene 2 | (x2, y2) | (w2, h2) | 00:02 |
| Scene 3 | (x3, y3) | (w3, h3) | 00:03 |
| Scene 4 | (x4, y4) | (w4, h4) | 00:04 |
| Scene 5 | (x5, y5) | (w5, h5) | 00:05 |

FIG. 3 is a diagram useful in explaining fast-forward or fast-rewind reproduction of the moving image, shown in FIGS. 2A to 2F. In FIG. 3, the controller 102 performs fast-forward or fast-rewind reproduction of the moving image by performing a drag operation for dragging the object on the screen.

Now, let it be assumed that Scene 5 is being reproduced and displayed in the reproduction mode. The position information of the object A in Scene 5 is expressed by (x5, y5).

When the user instructs pausing of the reproduction, the controller 102 renders a movement track 301 of the object A based on all of the position information registered as the object reproduction track data A.

Next, the user selects the position (x5, y5) of the object detected on Scene 5 by a touch operation on the touch panel 103. Then, when the user moves (drags) the touch point to a detected position (x1, y1) on the touch panel 103 without cancelling the touch operation, the controller 102 searches the memory 105 for a reproduction time associated with the detected position (x1, y1), and reproduces and displays Scene 1 on the display section 108, which has the reproduction time 00:01 associated with the detected position (x1, y1).

Figure 4:
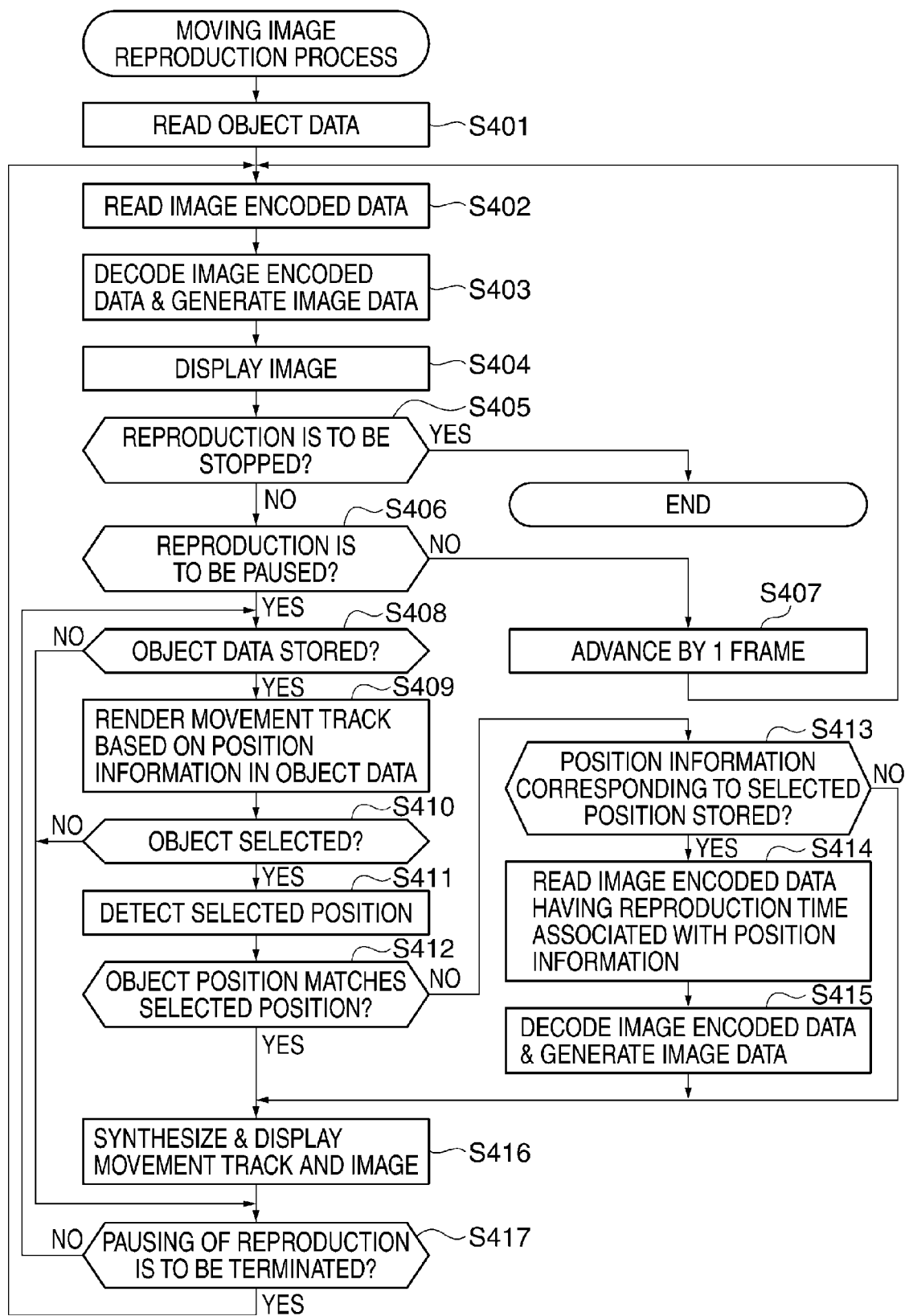
FIG. 4 is a flowchart of a moving image reproduction process for realizing moving image reproduction shown in FIG. 3.

FIG. 4 is a flowchart of the moving image reproduction process for realizing moving image reproduction shown in FIG. 3.

When the recording/reproduction apparatus 100 is shifted to the reproduction mode, the controller 102 reads the object reproduction track data A from the recording medium 109, and stores the read object reproduction track data A in the memory 105 before displaying a first image (video) (step S401). Then, the controller 102 loads a first portion of image encoded data (i.e. first frame) from a moving image file stored in the recording medium 109 into the memory 105 (step S402).

The controller 102 controls the CODEC 104 to decode the first portion of the image encoded data to thereby generate video data (step S403). Then, the controller 102 displays a video (image) corresponding to the video data on the display section 108 (step S404).

Next, the controller 102 checks whether or not a reproduction stop instruction has been received from the user (step S405). If a reproduction stop instruction has been received (YES to the step S405), the controller 102 terminates the reproduction operation.

On the other hand, if a reproduction stop instruction has not been received (NO to the step S405), the controller 102 determines whether or not a reproduction pause instruction has been received from the user (step S406). If a reproduction pause instruction has not been received from the user (NO to the step S406), the controller 102 advances the process to the next frame (step S407), and returns to the step S402.

As described above, if a reproduction pause instruction has not been received, the controller 102 performs the normal reproduction operation to thereby sequentially display video on the display section 108 frame by frame.

If a reproduction pause instruction has been received (YES to the step S406), the controller 102 searches the memory 105 to determine whether or not there is object reproduction track data recorded for the current frame (i.e. the video being displayed) (step S408). If there is object reproduction track data recorded for the current frame (YES to the step S408), the controller 102 renders a movement track on the display section 108 according to the position information so as to display changes in position information in the object reproduction track data (step S409).

Then, the controller 102 determines whether or not the user has selected the object (i.e. detected position) on the touch panel 103 (step S410). If the object has been selected (YES to the step S410), the controller 102 acquires the selected object (i.e. detected position) (step S411).

Next, the controller 102 determines whether or not the position of the object being displayed (display position) is identical to the selected detected position (step S412). If the position of the object in the frame being displayed is selected, this indicates that the display position of the object is identical to the selected detected position. On the other hand, if the user has selected the object, and has moved (dragged) the selected position in a direction of the movement track, this indicates that the display position of the object is different from the selected detected position.

If the display position of the object is different from the selected detected position (NO to the step S412), the controller 102 determines whether or not the detected position corresponding to the selected position has been recorded in the object reproduction track data (step S413). If the detected position corresponding to the selected position has been recorded (YES to the step S413), the controller 102 reads a frame (image encoded data) having the reproduction time associated with the detected position from the recording medium 109, and loads the frame into the memory 105 (step S414). The controller 102 controls the CODEC 104 to decode the image encoded data to thereby generate video data (step S415). Then, the controller 102 synthesizes the video data and the movement track and displays the resulting image on the display section 108 (in a manner such that the movement track is superimposed on the video) (step S416).

Thereafter, the controller 102 determines whether or not a reproduction pause termination instruction has been received (step S417). If a reproduction pause termination instruction has not been received (NO to the step S417), the controller 102 returns to the step S408, and repeats the process until a reproduction pause termination instruction is received. On the other hand, if a reproduction pause termination instruction has been received (YES to the step S417), the controller 102 returns to the step S402, and reads the next frame.

If the detected position corresponding to the selected position has not been recorded (NO to the step S413), the controller 102 judges that the user has selected a point other than the movement track, and proceeds to the step S416, wherein the video being currently displayed and the movement track are synthesized and displayed (in a manner such that the movement track is superimposed on the video).

Similarly, if the display position of the object is identical to the selected detected position (YES to the step S412), the controller 102 proceeds to the step S416, and synthesizes and displays the video being currently displayed and the movement track.

If it is determined in the step S410 that the object has not been selected (NO to the step S410), the controller 102 proceeds to the step S417. Similarly, if it is determined in the step S408 that the object reproduction track data has not been recorded (NO to the step S408), the controller 102 proceeds to the step S417.

As described above, when the user drags the position of the object (detected position) along the movement track, the controller 102 displays the frame associated with the position where the object is in after being dragged. As a result, the user can cause the display section 108 to immediately display a desired frame by an intuitive operation.

Next, a description will be given of an example of a recording/reproduction apparatus as a reproduction control apparatus according to a second embodiment of the present invention. The recording/reproduction apparatus as the reproduction control apparatus according to the second embodiment has the same configuration as that of the recording/reproduction apparatus shown in FIG. 1. Further, in the present embodiment, a description will be given of a case where a moving image photographed when an object moves toward the camera is reproduced.

FIGS. 5A to 5F are diagrams showing an example of a moving image displayed on the display section 108 appearing in FIG. 1, in which an object is moving toward the camera.

Referring to FIGS. 5A to 5F, Scene 0 to Scene 5 are included in the moving image, and the reproduction time is defined for each scene, similarly to the example shown in FIGS. 2A to 2F. Further, the object reproduction track data A is recorded in the same manner as described with reference to FIGS. 2A to 2F. In FIGS. 5A to 5F, since the object is moving toward the camera, there is almost no change in the position information of the image.

Figure 6:
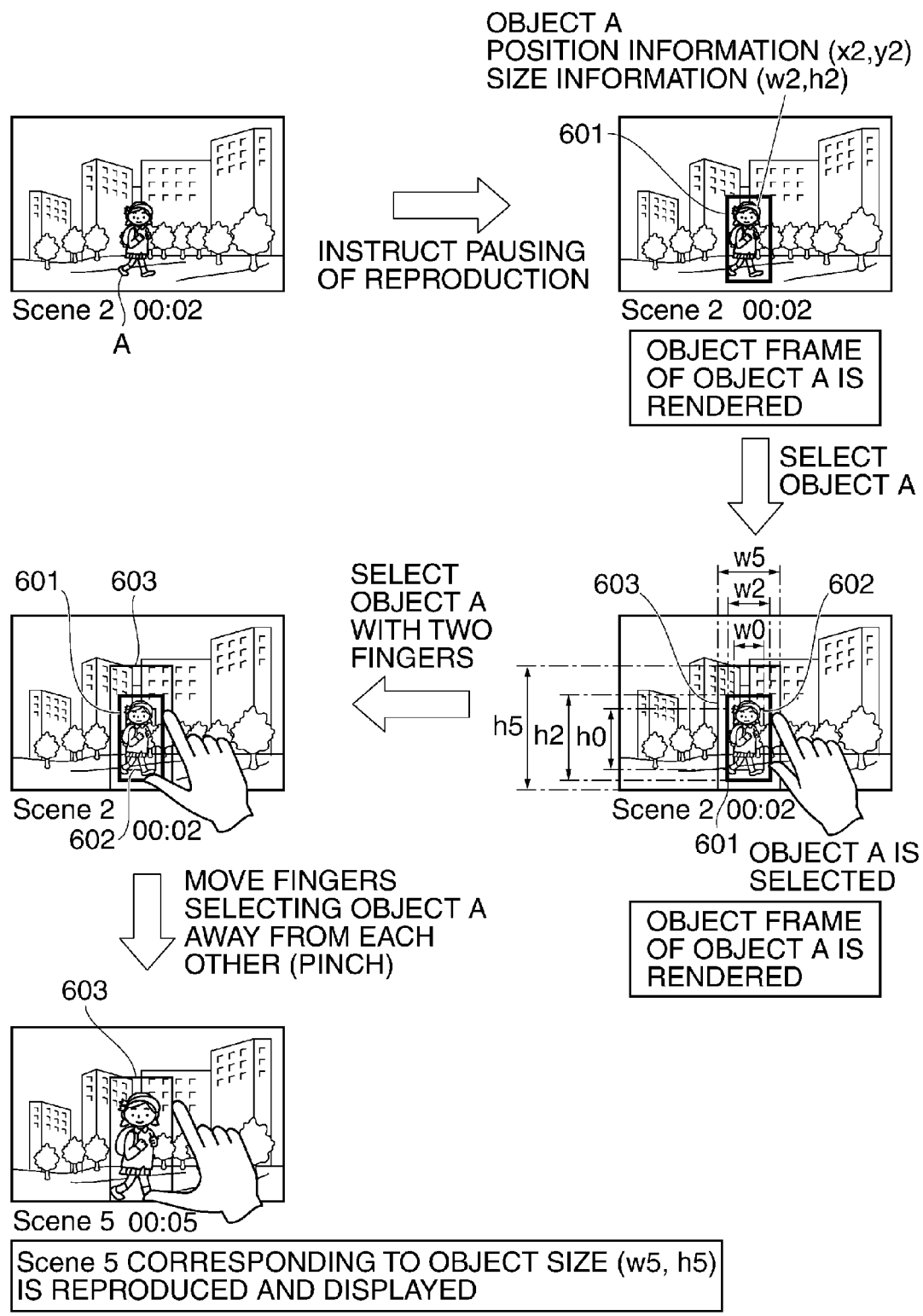
FIG. 6 is a diagram useful in explaining fast-forward or fast-rewind reproduction of the moving image, shown in FIGS. 5A to 5F.

FIG. 6 is a diagram useful in explaining fast-forward or fast-rewind reproduction of the moving image, shown in FIGS. 5A to 5F. In FIG. 6, the user selects an area of an image, in which the object is displayed, by touching the touch panel with two fingers at a time, and the controller 102 performs fast-forward or fast-rewind reproduction of the moving image depending on whether the user moves the two fingers away from each other or toward each other (hereinafter referred to as the pinch operation).

Now, let it be assumed that Scene 2 is being reproduced and displayed in the reproduction mode. Further, the position information and the size information of the object A in Scene 2 are expressed by (x2, y2) and (w2, h2), respectively. When the user provides a reproduction pause instruction, the controller 102 renders a frame (object frame) 601 which identifies the object A according to the position information and the size information of Scene 2, which have been registered as the object reproduction track data A.

Note that the controller 102 determines whether to render the movement track as described above, or render the object frame (i.e. object mark), according to the magnitude of the amount of change in the position information and that of the amount of change in the size information. That is, when the amount of change in the position information is larger than a predetermined value, and the amount of change in the size information is not larger than a predetermined value, the controller 102 renders the movement track. On the other hand, when the amount of change in the position information is not larger than the predetermined value, and the amount of change in the size information is larger than the predetermined value, the controller 102 renders the object frame 601.

Next, the user selects the object frame 601 in Scene 2 by a touch operation on the touch panel 103. At this time, the user selects the object frame 601 by touching diagonal points of the object frame 601 with his/her two fingers (e.g. thumb and forefinger) so as to perform the pinch operation.

Instead of displaying the movement track, the controller 102 displays a minimum size frame 602 and a maximum size frame 603 of the object in a plurality of scenes included in the moving image, based on the size information of the object, so as to make it obvious to the user that the size (magnitude) of the object has changed. This enables the user to easily grasp a range of changes in the size of the object.

When the user moves his/her two fingers (pinches out) at the touched positions on the touch panel 103 in a manner increasing the distance between the fingers without cancelling the touch operation, the controller 102 acquires the corresponding size information according to the distance between the two fingers. At this time, the controller 102 calculates a distance between the two fingers at the time when the user has selected the object according to the coordinates of the touched positions. Then, the controller 102 determines a ratio between the calculated distance and the size of the selected object frame (diagonal length of the frame).

When the distance between the two fingers has changed (has been increased in this example), the controller 102 determines a size of the object frame according to the above-mentioned ratio, and searches the object reproduction track data for size information which is most approximate to the determined size of the object frame. Then, the controller 102 searches the object reproduction track data A for a reproduction time associated with the size information, and thereby retrieves e.g. Scene 5 having the associated reproduction time 00:05, and displays Scene 5 on the screen, followed by pausing reproduction of the moving image.

Figure 7A:
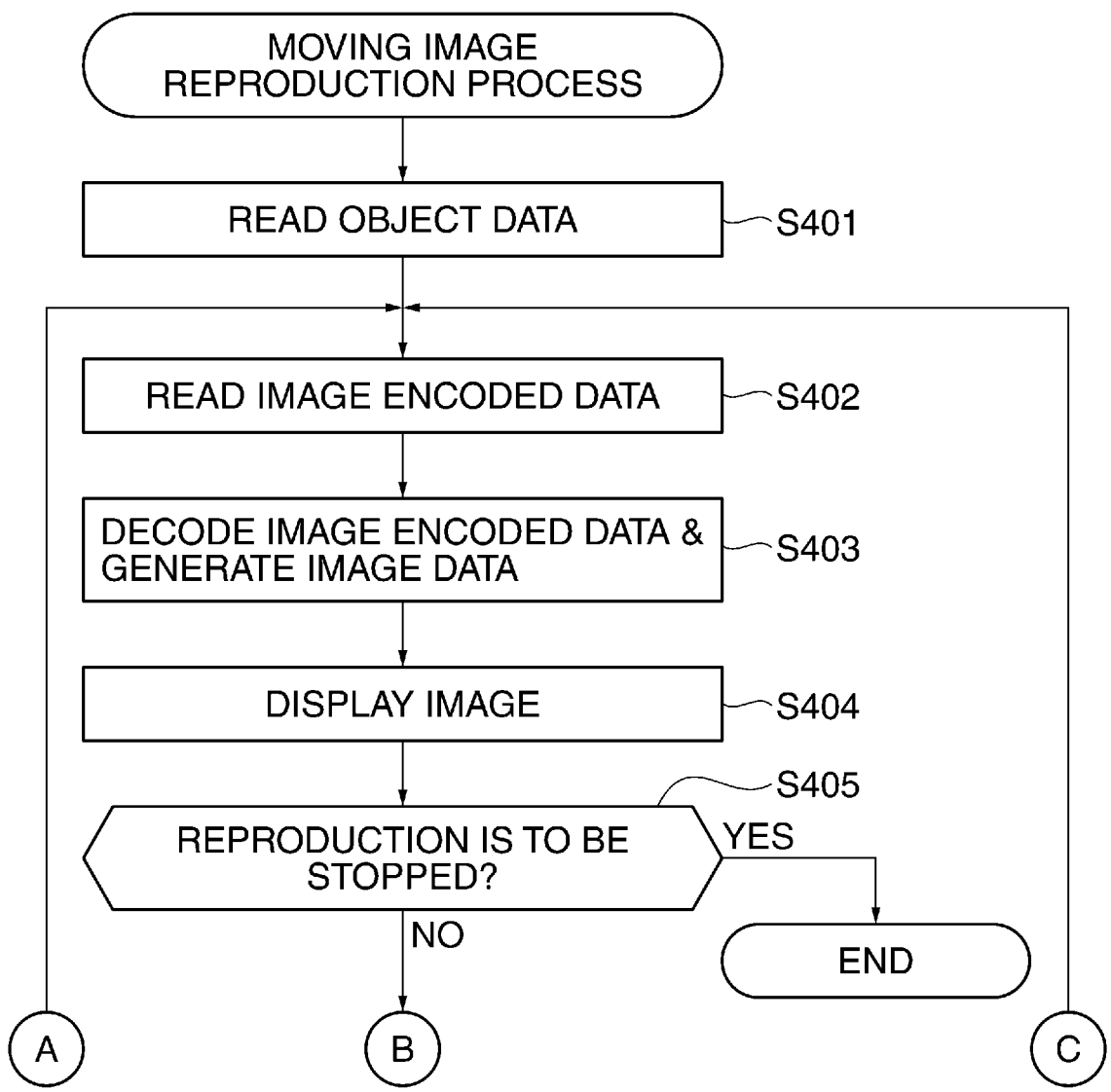
FIGS. 7A and 7B are a flowchart of a moving image reproduction process for realizing moving image reproduction shown in FIG. 6.
Figure 7B:
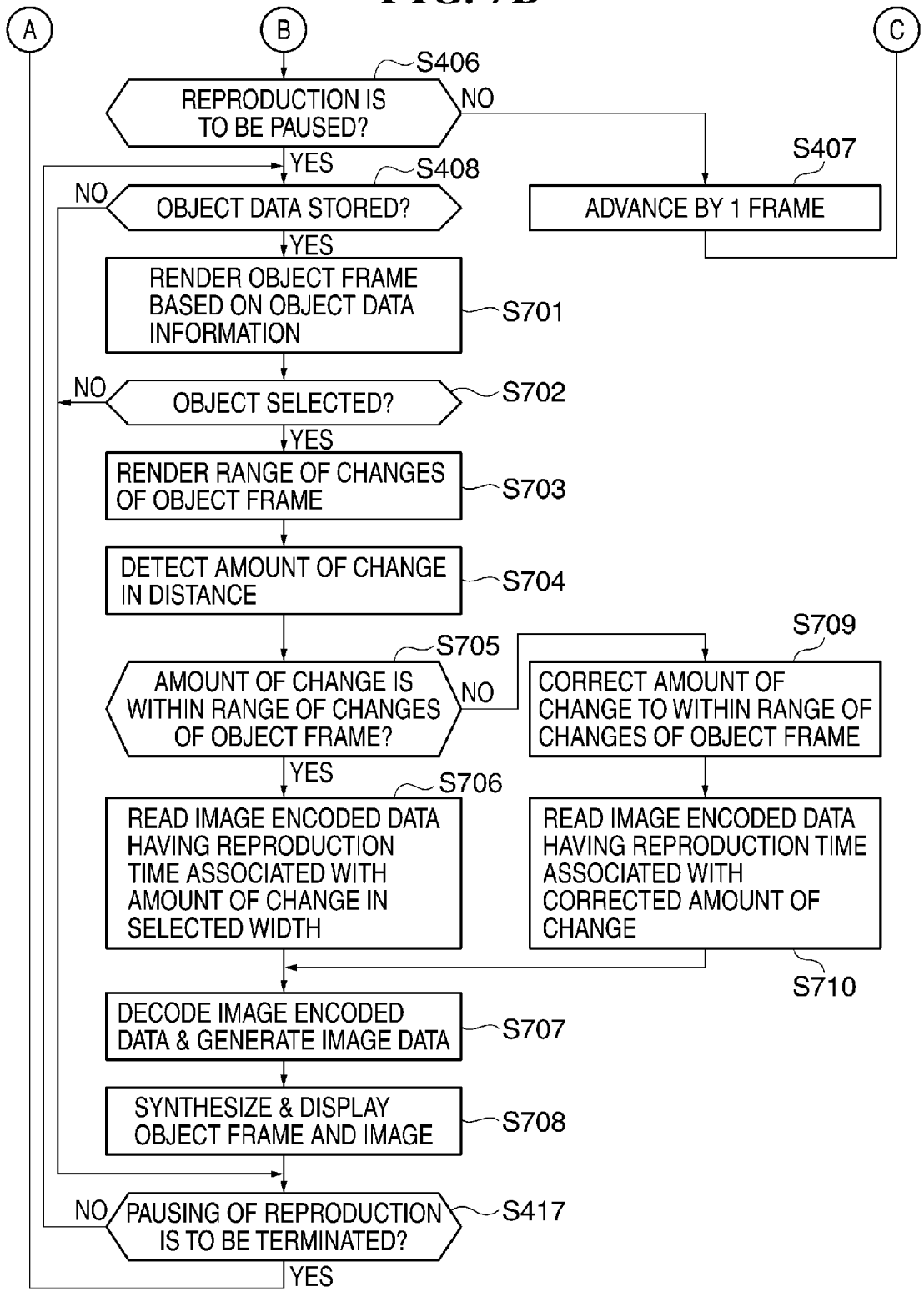

FIG. 7 is a flowchart of a moving image reproduction process for realizing moving image reproduction shown in FIG. 6. The same steps in FIG. 7 as those described with reference to FIG. 4 are denoted by the same step numbers, and description thereof is omitted.

If it is determined in the step S408, described with reference to FIG. 4, that there is object reproduction track data, the controller 102 renders the object frame 601 according to the position information and the size information of the object in the image being displayed so as to indicate changes in size information (step S701). Then, the controller 102 determines whether or not the object has been selected by the user with his/her two fingers on the touch panel 103 (step S702). In this step, if the position information of a specific object is included in a rectangular area having the two points touched by the two fingers as diagonal points, it is determined that the object has been selected, whereas if not, it is determined that no object has been selected.

If the object has been selected by the user with his/her two fingers (YES to the step S702), the controller 102 renders the range of changes of the object frame (minimum size and maximum size) as described with reference to FIG. 6 (step S703). Then, the controller 102 determines an amount of change in distance (width) between the two fingers according to changes in the points touched by the fingers on the touch panel 103 (step S704). That is, if the pinch operation is performed with the two fingers, the controller 102 calculates an amount of change in the distance.

Next, the controller 102 determines whether or not the above-calculated amount of change is out of the range of changes of the object frame (range of changes of the object frame or the object mark) (step S705). If the amount of change is within the range of changes (YES to the step S705), the controller 102 determines the changed object frame size according to the amount of change, and searches the object reproduction track data for size information most approximate to the determined object frame size. In this step, if a difference in both sides between the object frame size and the retrieved size information is within a predetermined range, it is determined that the retrieved size information is approximate to the object frame size, and the controller 102 reads a frame (image encoded data) having a reproduction time associated with the retrieved size information from the recording medium 109, and loads the frame into the memory 105 (step S706).

Next, the controller 102 controls the CODEC 104 to decode the loaded image encoded data to thereby generate video data (step S707). Then, the controller 102 synthesizes and displays the generated video data and the object frame on the display section 108 in a manner such that the object frame is superimposed on the video image (step S708). Thereafter, the controller 102 executes the step S417 described with reference to FIG. 4. If a reproduction pause termination instruction has not been received (NO to the step S417), the controller 102 returns to the step S408, and repeats the process until a reproduction pause termination instruction is received. As a result, if the pinch operation is continuously performed using the pointing member to continue the operation for designating an object frame, scenes in each of which the object having the size information associated with each designated object frame exists are sequentially displayed on the screen.

If the amount of change is out of the range of changes (NO to the step S705), the controller 102 corrects the amount of change such that it becomes within the range of changes (e.g. to the maximum size), and sets the amount of change to the thus corrected amount of change (step S709). The controller 102 determines an object frame size changed according to the corrected amount of change, and searches the object reproduction track data for size information most approximate to the determined object frame size. Then, the controller 102 reads a frame (image encoded data) having the reproduction time associated with the retrieved size information from the recording medium 109, and loads the frame into the memory 105 (step S710). Then, the controller 102 proceeds to the step S707.

If it is determined in the step S702 that the object has not been selected by the user with his/her two fingers (NO to the step S702), the controller 102 proceeds to the step S417 described with reference to FIG. 4.

Thus, in the second embodiment, when the user performs a pinch operation on the object frame, a frame (video) having the object size dependent on the amount of change due to the pinch operation is displayed, and hence the user can display a desired frame by an intuitive operation. Further, even when a moving image is such that an object does not move in a lateral direction on the screen, the user can perform fast-forward and fast-rewind reproduction of the moving image by an intuitive operation.

Although in the above description, reproduction of a moving image in which an object is zoomed in has been described, a moving image in which an object is zoomed out is also processed in a similar manner. Further, the process may be configured such that instead of searching the object reproduction track data for a reproduction time associated with the size information and pausing reproduction at a scene having the reproduction time found by the search, the reproduction of the moving image from the scene may be started by canceling the pausing thereof and setting the scene as a cue.

Next, a description will be given of a recording/reproduction apparatus as a reproduction control apparatus according to a third embodiment of the present invention. Note that the recording/reproduction apparatus as the reproduction control apparatus according to the third embodiment has the same configuration as that of the recording/reproduction apparatus shown in FIG. 1.

Although in the above-described first and second embodiments, the description has been given of reproduction of a moving image in which an object is moving in a lateral direction on the screen, and reproduction of a moving image in which an object is moving toward the camera on the screen, respectively, in the present embodiment, reproduction of a moving image in which an object is moving toward the camera while moving also in the lateral direction on the screen will be described.

FIGS. 8A to 8F are diagrams showing an example of a moving image displayed on the display section 108 appearing in FIG. 1, in which an object is moving toward the camera, while moving also in a lateral direction.

Referring to FIGS. 8A to 8F, Scene 0 to Scene 5 are included in the moving image, and the reproduction time is defined for each scene, similarly to the example shown in FIGS. 2A to 2F. Further, the object reproduction track data A is recorded in the same manner as described with reference to FIGS. 2A to 2F. In FIGS. 8A to 8F, since the object is moving toward the camera while moving also in the lateral direction, both of the position information of the object on the image and the size information of the same change.

FIG. 9 is a diagram useful in explaining fast-forward or fast-rewind reproduction of the moving image, shown in FIGS. 8A to 8F. In FIG. 9, the user selects an object on the image, and performs fast-forward or fast-rewind reproduction of the moving image by a drag operation or a pinch operation.

Now, let it be assumed that Scene 2 is reproduced and displayed in the reproduction mode. Further, the position information and the size information of the object A in Scene 2 are expressed by (x2, y2) and (w2, h2), respectively. When the user gives a reproduction pause instruction, since both of the position information and the size information have changed, the controller 102 renders a moving direction 901 of the object A according to all records of the position information, registered as the object reproduction track data A, and renders an object frame 902 according to the position information and the size information of the object A in scene 2.

Next, the user selects the object frame 902 by a touch operation on the touch panel 103. At this time, the user can select the object frame 902 using his/her two fingers (two touch points) in a manner pinching the object frame 902 to perform the pinch operation, or using his/her one finger (one touch point) to perform the drag operation.

When the user selects the object frame 902 using his/her two fingers, the controller 102 stops rendering (i.e. displaying) of the moving direction 901, and displays a minimum size frame 903 and a maximum size frame 904 of the object based on the size information of the object so as to make it obvious to the user that the size (magnitude) of the object has changed.

On the other hand, when the user selects the object frame 902 using his/her one finger, the controller 102 stops rendering of the object frame 902, and renders a movement track 905 which plots positions of the object according to all records of the position information, registered in the object reproduction track data A.

Then, as described in the first embodiment, fast-forward or fast-rewind reproduction of the moving image is performed according to the pinch operation or the drag operation. In the illustrated example, the pinch operation and the drag operation both result in reproduction and displaying of Scene 5 having the reproduction time 00:05.

As described above, when the user gives a reproduction pause instruction, the moving direction of the object and the object frame are displayed, and hence the user can recognize that the object is moving on the image and is also moving toward the camera. Further, the user can select whether to perform fast-forward or fast-rewind reproduction of the moving image by the drag operation or the pinch operation.

FIG. 10 is a flowchart of a moving image reproduction process for realizing moving image reproduction shown in FIG. 9. The same steps in FIG. 10 as those described with reference to FIG. 4 are denoted by the same step numbers, and description thereof is omitted.

If it is determined in the step S408, described with reference to FIG. 4, that there is object reproduction track data, the controller 102 renders both of the object moving direction 901 and the object frame 902 because the position information and the size information, registered as the object reproduction track data A, have changed (step S1001). Then, the controller 102 determines whether or not the object has been selected by a touch operation on the touch panel 103 (step S1002).

If the object has been selected (YES to the step S1002), the controller 102 determines whether or not the object has been selected by the user with his/her two fingers or one finger (step S1003). If the object has been selected by the user with his/her the two fingers (two fingers in the step S1003), the controller 102 stops rendering of the moving direction 901, and renders the range of changes of the object frame as described above (step S1004). Then, the controller 102 performs the process associated with the pinch operation (step S1005).

In the step S1005, the steps S704 to S710 described with reference to FIG. 7 are executed. Then, the controller 102 proceeds to the step S417 described with reference to FIG. 4.

On the other hand, if the object has been selected by the user with his/her one finger (one finger in the step S1003), the controller 102 stops rendering of the object frame 902, and renders the movement track 905 of the object as described hereinabove (step S1006). Then, the controller 102 performs the process associated with the drag operation (step S1007).

In the step S1007, the steps S411 to S416 described with reference to FIG. 4 are executed. Then, the controller 102 proceeds to the step S417 described with reference to FIG. 4.

If it is determined in the step S1002 that the object has not been selected (NO to the step S1002), the controller 102 proceeds to the step S417 described with reference to FIG. 4.

Thus, in the third embodiment, when the user performs the pinch operation on the object frame, the frame (video) having the object size dependent on the amount of change in size is displayed. Further, when the user performs the drag operation along the movement track of the object, a frame associated with the position where the object is in after being dragged is displayed. As a result, the user can cause the display section to immediately display a desired frame by an intuitive operation by selecting the pinch operation or the drag operation. Further, the user can perform fast-forward or fast-rewind reproduction of a moving image by an intuitive operation even if the moving image is the one in which an object is moving toward the camera while moving also in the lateral direction on the image.

Although in the above description, when performing the pinch operation, a ratio between a distance between two fingers touched for selection of an object and the size of the selected object frame (diagonal length of the frame) is determined, and a frame to be displayed is selected according to the determined ratio, this is not limitative, but the frame to be displayed may be selected according to positions where the touch panel 103 is touched.

FIG. 11 is a diagram showing an example of selection of a frame (image) to be displayed according to a pinch operation.

Referring to FIG. 11, now, let it be assumed that the frame (image) of Scene 2 is displayed on the display section 108, and an object frame 1101 is rendered. At this time, when the user touches the touch panel 103 by a pinch operation of moving his/her two fingers in a direction in which a distance between the fingers is increased, the controller 102 renders an object frame 1102 based on the positions of the two fingers. Then, the controller 102 searches for size information most approximate to the object frame 1102, selects a frame having a reproduction time associated with the size information found by the search (Scene 5 in this example), and displays the selected frame on the display section 108.

As a result, the user can perform fast-forward or fast-rewind reproduction of the moving image by a more intuitive operation.

Further, when the user performs the pinch operation, if the object moves on the image, the object frame and the positions of the two fingers may be separated. At this time, as long as the user continues to touch the touch panel 103 with his/her two fingers, by determining a frame to be displayed according to a ratio between the distance between the two fingers and the size of the selected object frame, the user can perform the pinch operation also in a case where the object moves on the image.

As is clear from the above description, in the illustrated example in FIG. 1, the controller 102 and the object detection section 110 function as a detection unit. Further, the touch panel 103 and the controller 102 function as a determination unit, and the controller 102 functions as a first display control unit and a second display control unit.

The present invention has been described heretofore based on the embodiments thereof. However, the present invention is not limited to these embodiments, but it is to be understood that the invention includes various forms within the scope of the gist of the present invention.

For example, a control method based on the functions of the above-described embodiments may be caused to be executed by the recording/reproduction apparatus. Further, a control program implementing the functions of the above-described embodiments may be caused to be executed by a computer provided in the recording/reproduction apparatus. The control program is stored e.g. in a computer-readable storage medium.

At this time, the control method and the control program each include e.g. a detecting step, a determining step, a first display controlling step, and a second display controlling step.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-266226, filed Dec. 5, 2012, and No. 2013-247637, filed Nov. 29, 2013 which are hereby incorporated by reference herein in their entirety.

What is claimed is:

1. A reproduction control apparatus that controls reproduction of a moving image including a plurality of frames, comprising:

a storage device; and a processor configured to execute computer executable instructions recorded on the storage device, the computer executable instructions including instructions, that when executed by the processor, cause the reproduction control apparatus to:

reproduce a first frame among the plurality of frames of the moving image;

render an object frame which identifies an object according to both a position and a size of the object which is included in the first frame of the moving image, during the reproduction of the first frame of the moving image;

detect selection of the object frame, of the first frame of the moving image, including the object during reproduction of the first frame of the moving image;

detect a change in size of the selected object frame, in response to a user's operation;

search for a second frame among the plurality of frames of the moving image, including the object corresponding in size to the changed size of the selected object frame; and reproduce the second frame including the object corresponding in size to the changed size of the selected object frame in response to the detection of the change in size of the selected object frame, the first frame having a first reproduction time and the second frame having a second reproduction time different from the first reproduction time.

2. The reproduction control apparatus according to claim 1, wherein the user's operation is an operation for designating two points on a reproduced moving image at the same time, the object frame having the designated two points as diagonal points, and changing a distance between the two points.

3. The reproduction control apparatus according to claim 2, wherein the computer executable instructions further include instructions, that when executed by the processor, cause the reproduction control apparatus to search, according to a change in distance between the two points, for the second frame.

4. The reproduction control apparatus according to claim 2, wherein the computer executable instructions further include instructions, that when executed by the processor, cause the reproduction control apparatus to, when two points on the reproduced moving image are designated at the same time, display a frame of a size corresponding to at least one of the maximum size and the minimum size of the object included in the object frame having the designated two points as diagonal points in a manner superimposed on the reproduced moving image.

5. The reproduction control apparatus according to claim 1, wherein the computer executable instructions further include instructions, that when executed by the processor, cause the reproduction control apparatus to selectively display a movement track of the object or an object frame which defines a location of the object according to at least one of an amount of change in the detected size and an amount of change in the detected position, in a manner superimposed on the reproduced moving image.

6. The reproduction control apparatus according to claim 5, wherein the user's operation is an operation for designating two points on a reproduced moving image at the same time, the two points being diagonal points of the object frame which defines the location of the object, and even if reproducing the second frame according to the change in distance between the two points separates the diagonal points of the object frame from the two points after the change of the distance, the reproduction control apparatus is caused to search again, according to a further change in distance between the two points in response to a continuous user's operation, for a frame including the object corresponding in size to a further changed size of the selected object frame.

7. The reproduction control apparatus according to claim 6, further comprising a touch panel,
  wherein the user's operation is an operation for touching the touch panel with user's two fingers to designate the two points and then moving, without cancelling the touching operation, the user's two fingers so as to change the distance therebetween to change the distance between the two points, and
  the continuous user's operation is an operation for moving, while continuing to touch the touch panel with the user's two fingers, the user's two fingers so as to further change the distance therebetween to further change the distance between the two points.

8. The reproduction control apparatus according to claim 1, wherein said reproduction control unit causes the moving image to be reproduced from the second frame which is used as a cue.

9. A method of controlling reproduction of a moving image including a plurality of frames, comprising:
  reproducing a first frame among the plurality of frames of the moving image;
  rendering an object frame which identifies an object according to both a position and a size of the object which is included in the first frame of the moving image, during the reproduction of the first frame of the moving image;
  detecting selection of the object frame, of the first frame of the moving image, including the object during reproduction of the first frame of the moving image;
  detecting a change in size of the selected object frame, in response to a user's operation;
  searching for a second frame among the plurality of frames of the moving image, including the object corresponding in size to the changed size of the selected object frame; and
  reproducing the second frame including the object corresponding in size to the changed size of the selected object frame in response to the detection of the change in size of the selected object frame, the first frame having a first reproduction time and the second frame having a second reproduction time different from the first reproduction time.

10. A non-transitory computer-readable storage medium storing a computer-executable control program for causing a computer to execute a method of controlling reproduction of a moving image including a plurality of frames,
  wherein the method comprises:
  reproducing a first frame among the plurality of frames of the moving image;
  rendering an object frame which identifies an object according to both a position and a size of the object which is included in the first frame of the moving image, during the reproduction of the first frame of the moving image;
  detecting selection of the object frame, of the first frame of the moving image, including the object during reproduction of the first frame of the moving image;
  detecting a change in size of the selected object frame, in response to a user's operation;
  searching for a second frame among the plurality of frames of the moving image, including the object corresponding in size to the changed size of the selected object frame; and
  reproducing the second frame including the object corresponding in size to the changed size of the selected object frame in response to the detection of the change in size of the selected object frame, the first frame having a first reproduction time and the second frame having a second reproduction time different from the first reproduction time.

* * * * *